United States Patent [19]

Landfors

[11] Patent Number: 4,845,360

[45] Date of Patent: Jul. 4, 1989

[54] COUNTERFLOW LEAK DETECTOR WITH HIGH AND LOW SENSITIVITY OPERATING MODES

[75] Inventor: Arthur A. Landfors, Brookline, Mass.

[73] Assignee: Varian Associates, Inc., Palo Alto, Calif.

[21] Appl. No.: 131,412

[22] Filed: Dec. 10, 1987

[51] Int. Cl.⁴ .............................................. H01J 49/04
[52] U.S. Cl. .................................. 250/288; 250/281;
   250/289; 73/40; 73/40.7; 417/152; 417/153; 417/154
[58] Field of Search .................... 250/281, 282, 288 R,
   250/288 A, 289; 417/152, 153, 154; 73/40, 40.7

[56] References Cited

U.S. PATENT DOCUMENTS

| | | | |
|---|---|---|---|
| 3,342,990 | 9/1967 | Barrington et al. | 250/288 |
| 3,520,176 | 7/1970 | Becker | 73/40.7 |
| 3,626,760 | 12/1971 | Briggs et al. | 73/40.7 |
| 3,690,151 | 9/1972 | Briggs | 73/40.7 |
| 4,086,031 | 4/1978 | Kuypers | 417/154 |
| 4,472,962 | 9/1984 | Mennenga | 73/40.7 |
| 4,499,752 | 2/1985 | Fruzzetti et al. | 73/40.7 |

OTHER PUBLICATIONS

W. C. Worthington, "New Developments in Trapless Leak Detection", *Research/Development*, Nov., 1976.

"Introduction to Helium Mass Spectrometer Leak Detection", Varian Associates, Inc., 1980, pp. 26-45.
"New Dimensions in Leak Detection", VAC 1104C, 12/82, Varian/Lexington Vacuum Division.

Primary Examiner—Jack I. Berman
Attorney, Agent, or Firm—Stanley Z. Cole; John C. Yakes; William R. McClellan

[57] ABSTRACT

A counterflow helium mass spectrometer leak detector in which a helium sample passes in a reverse direction through a diffusion pump to a mass spectrometer for measurement. The diffusion pump includes a conventional foreline and a second foreline provided with an ejector stage. A test sample is coupled from a test port through a bypass valve to the conventional foreline in a high sensitivity mode and is coupled to the second foreline in a low sensitivity mode. In the low sensitivity mode, the bypass valve is closed. An apertured control plate in the diffusion pump controls the relative reverse rates of duffusion from each foreline to the diffusion pump inlet by controlling the rates of vapor flow to annular pumping stages and to the ejector stage. The ejector stage includes a nozzle for directing a stream of vapor into the second foreline so as to inhibit flow of helium into the diffusion pump and establish a lower reverse diffusion rate at the second foreline. The disclosed configuration permits measurement of a large range of leak rates.

26 Claims, 3 Drawing Sheets

COUNTERFLOW LEAK DETECTOR WITH HIGH AND LOW SENSITIVITY OPERATING MODES

FIELD OF THE INVENTION

This invention relates to detection of leaks in sealed articles and, more particularly, to a helium mass spectrometer leak detector having high and low sensitivity operating modes, so as to permit measurement of a very large range of leak rates.

BACKGROUND OF THE INVENTION

Helium mass spectrometer leak detection is a well-known leak detection technique. Helium is used as a tracer gas which passes through the smallest of leaks in a sealed test piece. After passing through a leak, a test sample containing helium is drawn into a leak detection instrument and measured. An important component of the instrument is a mass spectrometer tube which detects and measures the helium. The input test sample is ionized and mass analyzed by the spectrometer tube in order to separate the helium component. In one approach, the test piece is pressurized with helium. A sniffer probe connected to the test port of the leak detector is moved around the exterior of the test piece. Helium passes through leaks in the test piece, is drawn into the probe and is measured by the leak detector. In the most commonly-used approach, the interior of the test piece is coupled to the test port of the leak detector and is evacuated. Helium is sprayed onto the exterior of the test piece, is drawn inside through a leak and is measured by the leak detector.

One of the requirements of the spectrometer tube is that the inlet through which the helium is received be maintained at a relatively low pressure, typically $2 \times 10^{-4}$ torr. In a so-called conventional leak detector, a diffusion pump and associated forepump and a cold trap are utilized to maintain the input of the spectrometer tube at the required pressure. The conventional leak detector provides satisfactory performance under a variety of conditions, but has certain drawbacks. The test port, which is connected to the test unit or to the sniffer probe, must be maintained at a relatively low pressure. Thus, the vacuum pumping cycle is relatively long. Furthermore, in the testing of leaky or large volume parts, it may be difficult or impossible to reach the required pressure level. If the required pressure level can be reached, the pumping cycle is lengthy.

Many of these problems were eliminated in the counterflow leak detector disclosed by Briggs in U.S. Pat. No. 3,690,151. A counterflow leak detector is also disclosed by Fruzzetti et al in U.S. Pat. No. 4,499,752. In the counterflow leak detector, the mass spectrometer tube is connected to the inlet of a diffusion pump, and the helium tracer gas is introduced through the foreline, or normal output port, of the diffusion pump. The diffusion pump exhibits a high pressure ratio for heavier gases, but a low pressure ratio for lighter gases such as helium. Therefore, helium diffuses at an acceptable rate in a reverse direction through the diffusion pump to the spectrometer tube and is measured. Heavier gases in the sample are to a large degree blocked by the diffusion pump and are prevented from reaching the spectrometer tube.

The technique of reverse flow of helium through the diffusion pump permits the leak detector test port to be operated at the pressure required at the diffusion pump foreline. This pressure is several orders of magnitude higher than the required operating pressure of the spectrometer tube. Performing leak tests at a higher test pressure is advantageous for several reasons. Leaky or large volume pieces can be tested, since the test pressure is relatively easy to attain. In addition, vacuum pumping of the test piece, regardless of its size or leak rate, is faster. The counterflow leak detector has provided highly satisfactory operation under a wide variety of conditions.

Commercially available counterflow leak detectors typically can measure a range of leaks from $1 \times 10^{-9}$ std cc/sec to $1 \times 10^{-5}$ std cc/sec in four ranges: $0-1 \times 10^{-8}$, $0-1 \times 10^{-7}$, $0-1 \times 10^{-6}$ and $0-1 \times 10^{-5}$ std cc/sec. Should the leak exceed $1 \times 10^{-5}$ std cc/sec, the meter on the leak detector goes off-scale, and the operator must remove the probe and wait for the helium in the system to be pumped out. The four decade range of prior art counterflow leak detectors is established primarily by the input range of the mass spectrometer tube. While the above range of leak detector operation is usually satisfactory, there are some cases where more than four decades of operation are required. Techniques which involve modifications to the spectrometer tube and additional electronic circuitry have been developed for increasing the operating range of leak detectors. This approach has proven to be expensive and complex.

The maximum allowable test port pressure is higher for the counterflow configuration than for conventional leak detectors. Nonetheless, reaching even the higher test port pressure can be difficult when testing large volumes, dirty parts, or parts with large leaks.

It is a general object of the present invention to provide an improved helium mass spectrometer leak detector.

It is another object of the present invention to provide a leak detector capable of measuring a wide range of leak rates.

It is a further object of the present invention to provide a leak detector which can be operated at a relatively high test port pressure.

It is yet another object of the present invention to provide a leak detector having a diffusion pump with a low sensitivity foreline and a high sensitivity foreline.

It is still another object of the invention to provide a leak detector having high and low sensitivity operating modes.

SUMMARY OF THE INVENTION

According to the present invention, these and other objects and advantages are achieved in apparatus for leak detection comprising a test port adapted for receiving a test sample containing a trace gas, a gas analysis instrument tuned to detect the trace gas and having an inlet for receiving the trace gas, a diffusion pump having a pump inlet coupled to the inlet of the gas analysis instrument, a first foreline and a second foreline, and vacuum pumping means for evacuation of the apparatus in preparation for a leak test. The diffusion pump has a first rate of reverse diffusion for the trace gas from the first foreline to the pump inlet and has a second rate of reverse diffusion for the trace gas from the second foreline to the pump inlet, the second reverse diffusion rate being lower than the first reverse diffusion rate. The leak detection apparatus further includes means for conducting the test sample from the test port to the first foreline of the diffusion pump in a high sensitivity operating mode and for conducting the test sample from the test port to the second foreline of the diffusion pump in a low sensitivity operating mode.

The diffusion pump includes an ejector stage associated with the second foreline, at least one annular stage and a vapor source for supplying vapor to the annular stage and to the ejector stage. The ejector stage includes an ejector nozzle which directs vapor from the vapor source into the second foreline, which is cooled so as to condense the vapor. The ejector stage reduces the rate of flow of the test sample through the second foreline. The annular stage includes an annular nozzle that directs vapor from the vapor source into an annular space and in the direction of the first and second forelines. The vapor is condensed by a cooled cylindrical wall.

The leak detection apparatus preferably includes means for controlling the ratio between the first reverse diffusion rate and the second reverse diffusion rate. The control means can comprise an apertured control plate for controlling the relative rates of vapor flow from the vapor source to the annular stages and to the ejector stage. In a preferred embodiment, the control means establishes a ratio between the first and second reverse diffusion rates of about 100.

Preferably, the leak detection apparatus is provided with means for cooling the vapor directed into the second foreline. The cooling means can comprise cooling fins on the second foreline and means for directing air flow over the cooling fins.

The conducting means preferably includes a bypass valve coupled to the first foreline. When the bypass valve is open, the test sample enters the diffusion pump through the first foreline, and high sensitivity operation is provided. When the bypass valve is closed, the test sample is blocked from the first foreline and enters the diffusion pump only through the second foreline so as to provide low sensitivity operation.

According to another aspect of the invention, there is provided a diffusion pump for use in a counterflow leak detector comprising a pump inlet, a first foreline, a second foreline, pumping means for providing a first reverse diffusion rate for light gases between the first foreline and the pump inlet and for providing a second reverse diffusion rate for light gases between the second foreline and the pump inlet, and a vapor source for supplying a vapor to the pumping means. Preferably, the pumping means comprises an ejector stage associated with the second foreline and one or more annular stages arranged so that light gases pass from the first foreline through the annular stages to the pump inlet and arranged so that light gases pass from the second foreline through the ejector stage and through the annular stages to the pump inlet.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
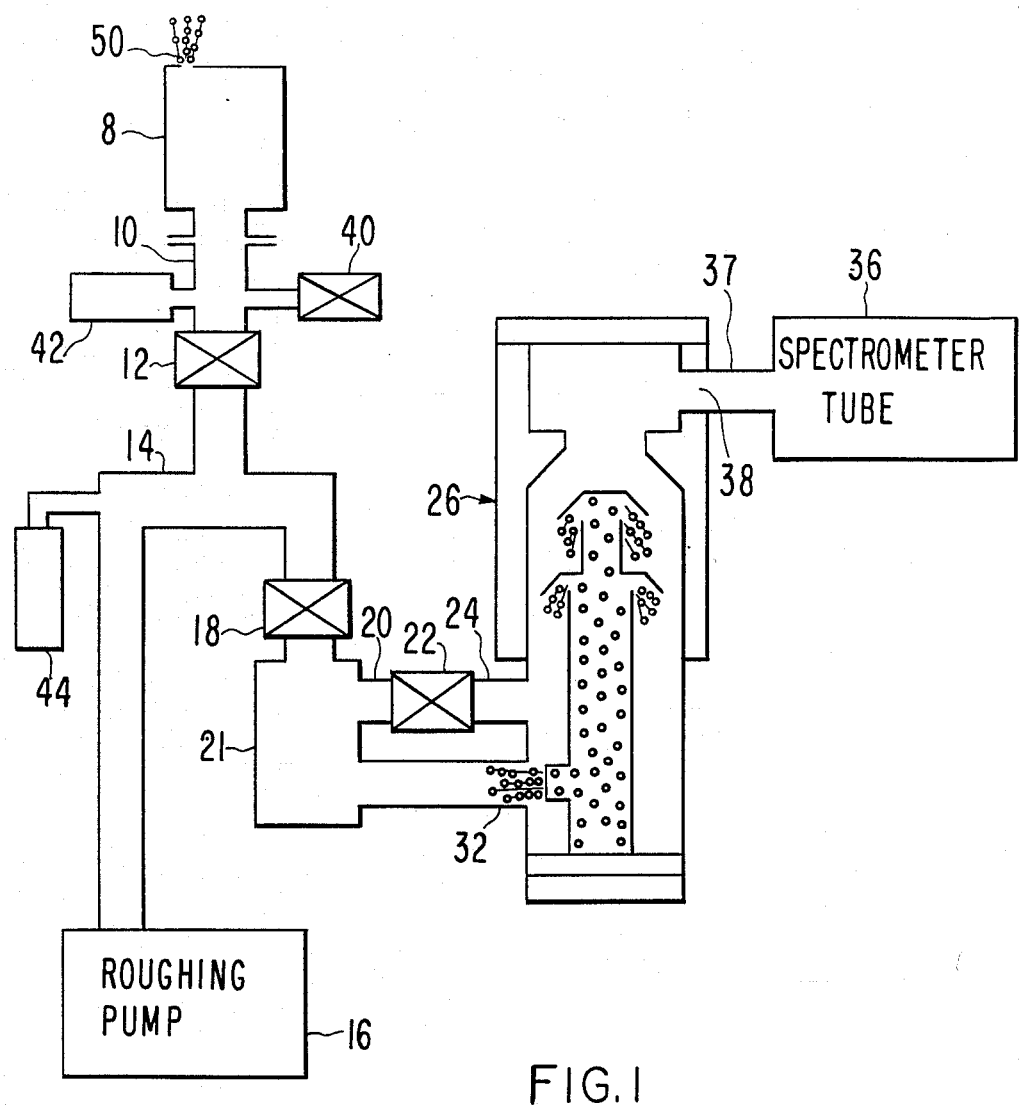
FIG. 1 is a block diagram of a leak detection system in accordance with the present invention.

A leak detection system in accordance with the present invention is shown in schematic form in FIG. 1. A test piece 8 or a sniffer probe (not shown) is coupled vacuum-tight to a test port 10. The test port 10 is coupled to one side of a roughing valve 12. The other side of the roughing valve 12 is coupled by a conduit 14 to a roughing pump 16. Conduit 14 includes a branch connection to one side of a foreline valve 18. The other side of foreline valve 18 is coupled to a vacuum reservoir 21. The vacuum reservoir 21 is coupled through a conduit 20 and a bypass valve 22 to a first foreline 24 of a diffusion pump 26. The vacuum reservoir 21 is also coupled directly to a second foreline 32 of diffusion pump 26. A mass spectrometer tube 36 includes a conduit 37 coupled to an inlet 38 of diffusion pump 26. A vent valve 40 and a pressure gauge 42 are coupled to the test port 10. A calibrated leak 44 is coupled to conduit 14.

The leak detection system shown in FIG. 1 and described hereinabove utilizes the so-called counterflow configuration wherein a test sample received from test piece 8 passes in a reverse direction through diffusion pump 26 to spectrometer tube 36. The diffusion pump 26 pumps constantly on the spectrometer tube 36 to maintain the required working pressure. The characteristic which permits diffusion pumps to be used in reverse or counterflow operation for leak detection is differential reverse diffusion rates for heavy gases and light gases. That is, some fraction of the light gases including helium pass through the diffusion pump in a reverse direction from foreline to inlet, while a much smaller fraction of the heavy gases pass through the pump in the reverse direction. The use of a diffusion pump in counterflow operation is described in U.S. Pat. No. 3,690,151 and by Worthington in "New Developments in Trapless Leak Detection," *Vacuum Technology Research/Development*, November, 1976.

In the leak detection system of the present invention, the diffusion pump 26 includes foreline 24 and foreline 32. Foreline 24 is a conventional diffusion pump foreline. The diffusion pump 26 exhibits a prescribed reverse diffusion rate from foreline 24 to inlet 38. An ejector stage associated with foreline 32 as described hereinafter directs a stream of vapor into foreline 32. The stream of vapor tends to inhibit passage of the test sample from vacuum reservoir 21 through foreline 32 into diffusion pump 26. Furthermore, the tendency for the stream of vapor to inhibit flow of the test sample is greater for heavy gases than for light gases. Thus, a portion of the helium in the test sample passes through foreline 32 and through diffusion pump 26 to inlet 38 and is measured by spectrometer tube 36. Heavier gases in the test sample are, to a large extent, blocked from passing through foreline 32.

In effect, foreline 24 is a high sensitivity input port, and foreline 32 is a low sensitivity input port of diffusion pump 26. The sensitivity of the diffusion pump in the counterflow configuration corresponds to the reverse diffusion rate or to the compression ratio for helium. In a preferred embodiment, the compression ratio for helium is typically about 10 for foreline 24 and is about 1,000 for foreline 32. Thus, when bypass valve 22 is closed, the test sample is blocked from reaching foreline 24, and the leak detection system is 100 times less sensitive than with bypass valve 22 open.

In operation, the test piece 8, or a sniffer probe, is attached to the test port 10. The test piece 8 may have one or more leaks which are to be measured by the system. Initially, the vent valve 40 and the roughing valve 12 are closed, and the foreline valve 18 is open. After the test piece 8 is mounted on the test port 10, the foreline valve 18 is closed, and the roughing valve 12 is opened, thereby permitting rough vacuum pumping of the test piece 8 (or the sniffer probe line) and the test port 10 by roughing pump 16 to a pressure of approximately 100 to 300 millitorr. When the required pressure is reached, the foreline valve 18 is opened so as to permit a leak test of the test piece 8. The opening and closing of the valves can be controlled manually, such as from an operator console, or can be controlled automatically by either a microprocessor control system or an electrical control system which receives inputs from the pressure gauge 42.

When the foreline valve 18 is open, the roughing pump 16 maintains the forelines 24 and 32 of diffusion pump 26 at a pressure on the order of 100 to 300 millitorr, and leak testing can proceed. The tracer gas helium is introduced onto the outer surface of the test piece 8 such as by a helium spray. The test sample containing helium is drawn through a leak 50 (or several leaks) into the interior of test piece 8 and passes into the leak detection system through test port 10. The test sample then passes through foreline valve 18 into the vacuum reservoir 21 and to foreline 32. When bypass valve 22 is open, most of the test sample passes through conduit 20 and bypass valve 22 to foreline 24. Thus, the test sample is conducted during a leak test from test port 10 to second foreline 32. When the bypass valve 22 is open, the test sample is also conducted during a leak test from test port 10 to first foreline 24.

The helium in the test sample, because of its light weight, diffuses in a reverse direction through the diffusion pump 26 to the spectrometer tube 36. The spectrometer tube 36 is tuned to detect and measure helium and to provide an output signal which is proportional to the quantity of helium in the test sample received from the test piece 8, or from the sniffer probe. The helium concentration is proportional to the leak rate of the test piece 8. While the diffusion pump 26 passes only a specified fraction of the helium to the spectrometer tube 36, a sufficient quantity reaches the spectrometer tube 36 to permit a highly accurate reading of leak rate.

In most cases, leak testing is performed with the bypass valve 22 open. When bypass valve 22 is open, the test sample passes through conduit 20 and through high sensitivity foreline 24, and the leak detection system is in a high sensitivity mode. When the amount of helium received in the test sample is so large as to exceed the range of the spectrometer tube 36, the bypass valve 22 is closed, either manually or automatically, and the system is in a low sensitivity mode. Then, the test sample is blocked from passing through foreline 24, and the test sample passes only through foreline 32. As described above, foreline 32 has relatively low sensitivity, and a lesser amount of helium reaches the spectrometer tube 36. As a result, the helium in the test sample is likely to be within the range of the spectrometer tube 36 in the low sensitivity mode. By providing the diffusion pump 26 with a high sensitivity foreline 24 and a low sensitivity foreline 32, the leak detection range of the system is expanded. It will be understood that a valve can also be placed between vacuum reservoir 21 and foreline 32 so as to block foreline 32 in the high sensitivity mode. However, such a valve is not necessary since the sensitivity at foreline 32 is much less than the sensitivity at foreline 24, and helium passing through foreline 32 has a minimal effect on the spectrometer tube reading in the high sensitivity mode.

After leak testing is complete, the roughing valve 12 is closed. Then, the vent valve 40 is opened to vent the test piece 8 to atmosphere and permit its removal.

Figure 2:
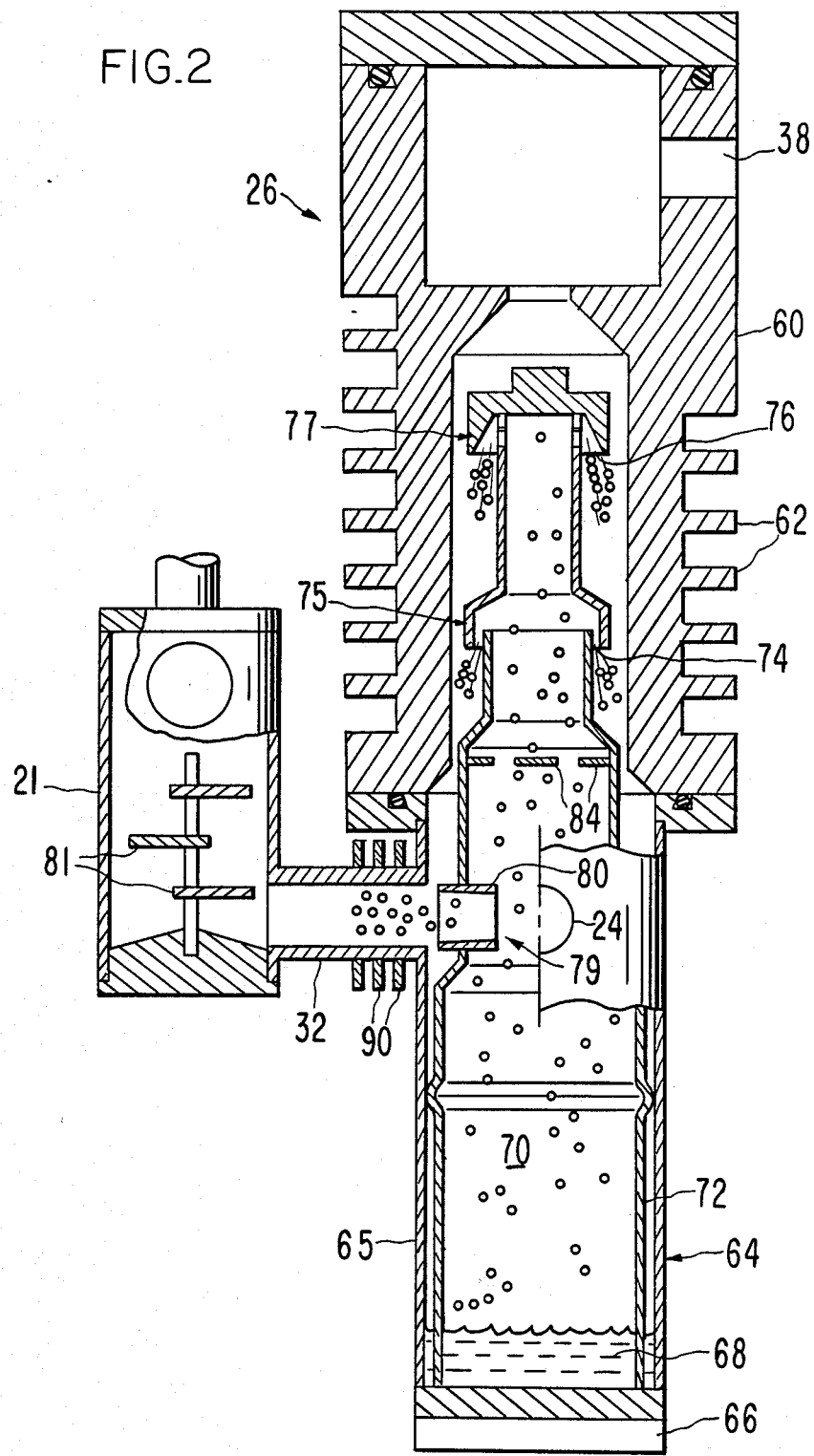
FIG. 2 is a cross-sectional elevation view of the diffusion pump and associated elements utilized in the leak detection system of FIG. 1.
Figure 3:
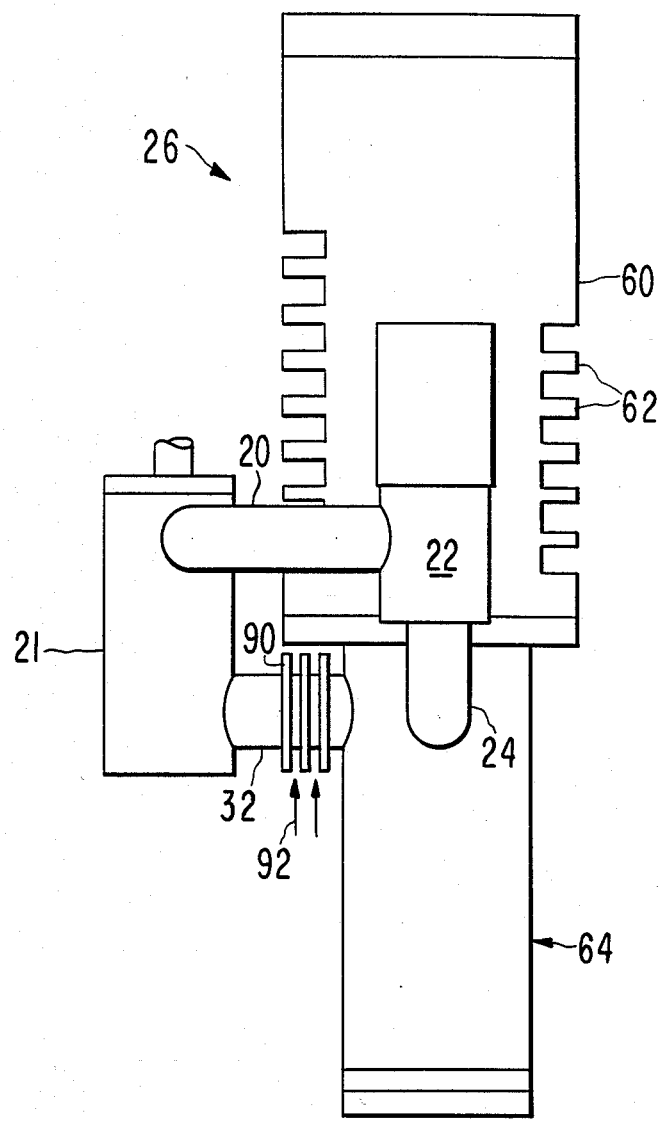
FIG. 3 is an elevation view of the diffusion pump and associated elements shown in FIG. 2

An example of a diffusion pump 26 suitable for use in the leak detection system of FIG. 1 is shown in FIGS. 2 and 3. The diffusion pump 26 includes an outer housing 60 having cooling fins 62 and a boiler 64 sealed to the bottom of housing 60. The boiler 64 is the vapor source and includes a boiler shell 65, a heater 66 and a liquid reservoir 68. The heater 66 causes a liquid in reservoir 68 to boil off as a vapor which passes through an interior region 70 defined by a cylindrical sheet metal structure called a jet assembly 72. The jet assembly 72 has an annular opening 74 through which the vapor passes in a generally conical stream to form a first annular pumping stage 75, and a second annular opening 76 through which vapor passes in a conical spray to form a second annular stage 77. The configuration of jet assembly 72 and annular openings 74, 76 to form first and second annular stages 75, 77 is conventional in diffusion pumps. Each annular stage 75, 77 consists of an annular nozzle which directs vapor from the vapor source into an annular space and in the direction of forelines 24, 32. The vapor is condensed by the cooled cylindrical outer housing 60.

In the diffusion pump illustrated in FIGS. 2 and 3, the foreline 32 enters from one side and the foreline 24 enters from another side in the same horizontal plane, as best seen in FIG. 3. With reference to FIG. 2, the foreline 24 extends outwardly from the plane of the paper. Foreline 24 is coupled through bypass valve 22 and conduit 20 to vacuum reservoir 21, and foreline 32 is coupled directly to vacuum reservoir 21. Vacuum reservoir 21 acts as a ballast to maintain a relatively low pressure at the diffusion pump forelines 24, 32 when foreline valve 18 is temporarily closed during roughing. The vacuum reservoir 21 includes baffles 81 which inhibit vapor from the diffusion pump 26 from passing back through the system. Foreline 24 connects to the space between boiler shell 65 and jet assembly 72. The test sample is inhibited from reaching inlet 38 by the two conical streams of vapor in pumping stages 75 and 77 as known in the prior art.

The foreline 32 is connected to the space between boiler shell 65 and the jet assembly 72. An ejector stage 79 is formed by a nozzle 80 that passes through jet assembly 72 and is aligned with foreline 32. A portion of the vapor generated by vapor source 64 passes as a vapor stream from interior region 70 through nozzle 80 into foreline 32. The vapor is condensed by cooling foreline 32 as described hereinafter. The vapor stream directed outwardly through foreline 32 has a tendency to inhibit entry of the test sample containing helium into the diffusion pump 26. As noted above, the diffusion rate of helium in a reverse direction from foreline 32 to inlet 38 is less than the diffusion rate from foreline 24 to inlet 38 because of the ejector stage 79. While the ratio of reverse diffusion rates for forelines 24 and 32 can be varied in accordance with a particular application between 10 and 500, it is preferred that the helium diffusion rate through foreline 32 be about 100 times less than the helium diffusion rate through foreline 24. In a preferred embodiment, the nozzle 80 is a cylindrical tube of uniform inside diameter of ⅜-inch.

In operation, gas entering the diffusion pump 26 through foreline 24 passes through the annular stages 75 and 77 to inlet 38, while gas entering the diffusion pump 26 through foreline 32 passes through ejector stage 79 and annular stages 75 and 77 in series. Therefore, the reverse diffusion rate from foreline 32 to inlet 38 is lower than the reverse diffusion rate from foreline 24 to inlet 38.

The relative reverse diffusion rates are determined by the relative densities at which vapor from the interior region 70 flows through annular stages 75 and 77 and through ejector stage 79. In order to establish a desired ratio of reverse diffusion rates, the relative vapor flows to annular stages 75, 77 and to ejector stage 79 can be controlled. In a preferred embodiment, an apertured control plate 84 is positioned in jet assembly 72 above nozzle 80 so as to restrict the flow of vapor to annular stages 75, 77. With a control plate 84 having four holes, each 3/16-inch in diameter, the reverse diffusion rate of helium through foreline 32 is approximately 100 times lower than the reverse diffusion rate of helium through foreline 24. By varying the size and number of holes in control plate 84, the ratio can be varied.

It is preferable to provide means for cooling the foreline 32 in order to condense the stream of vapor passing through ejector stage 79. The condensed vapor then flows by gravity into reservoir 68 and is again vaporized in a continuous cycle. In a preferred embodiment, the cooling means comprises cooling fins 90 on foreline 32 and air flow, as indicated by the arrow 92, over fins 90 for heat removal. It will be understood that any convenient cooling means such as liquid cooling can be utilized.

As described above, the leak detector of the present invention is capable of measuring a wide range of leak rates as a result of the high and low sensitivity operating modes. In addition, the tolerable forepressure, which is defined as the foreline pressure required to break down the vapor jets in the diffusion pump 26, at foreline 32 is substantially higher than the tolerable forepressure at foreline 24. Typically, the tolerable forepressure at foreline 24 is about 0.1 torr, and the tolerable forepressure at foreline 32 is about 0.4 torr. As a result, the low sensitivity operating mode is useful in testing large volumes, dirty parts, or parts with large leaks where the 0.1 torr pressure level may be difficult or impossible to reach.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Apparatus for leak detection comprising:
   a test port for receiving a test sample containing a trace gas;
   mass spectrometer means tuned to detect said trace gas and having an inlet for receiving said trace gas;
   vacuum pumping means for evacuation of said apparatus in preparation for a leak test;
   a diffusion pump having a pump inlet coupled to the inlet of said mass spectrometer means, a first foreline and a second foreline, said diffusion pump having a first rate of reverse diffusion for said trace gas from said first foreline to said pump inlet and having a second rate of reverse diffusion for said trace gas from said second foreline to said pump inlet, said second reverse diffusion rate being lower than said first reverse diffusion rate; and
   means for conducting said test sample from said test port to said first foreline in a high sensitivity operating mode and for conducting said test sample from said test port to said second foreline in a low sensitivity operating mode.

2. Leak detection apparatus as defined in claim 1 further including means for controlling the sensitivity ratio between said high sensitivity operating mode and said low sensitivity operating mode.

3. Leak detection apparatus as defined in claim 2 wherein said diffusion pump includes an ejector stage associated with said second foreline, at least one annular stage and a vapor source for supplying vapor to said annular stage and to said ejector stage, and wherein said control means comprises an apertured control plate for controlling the relative rates of vapor flow from said vapor source to said annular stage and to said ejector stage.

4. Leak detection apparatus as defined in claim 3 wherein said control plate is positioned between said vapor source and said annular stage.

5. Leak detection apparatus as defined in claim 2 wherein said sensitivity ratio between said high and low sensitivity operating modes is between 10 and 500.

6. Leak detection apparatus as defined in claim 3 wherein said ejector stage directs a stream of vapor through an ejector nozzle into said second foreline, and further including means for cooling the vapor directed through said ejector nozzle.

7. Leak detection apparatus as defined in claim 6 wherein said cooling means comprises cooling fins on said second foreline and means for directing an air flow over said cooling fins.

8. Leak detection apparatus as defined in claim 7 wherein said mass spectrometer means comprises a mass spectrometer tube.

9. Leak detection apparatus as defined in claim 1 wherein said diffusion pump includes an ejector stage associated with said second foreline, at least one annular stage and a vapor source for supplying vapor to said annular stage and to said ejector stage, and wherein said ejector stage includes means for directing vapor from said source through an ejector nozzle into said second foreline.

10. Leak detection apparatus defined in claim 9 wherein said conducting means comprises
    a vacuum reservoir having an inlet for receiving said test sample from said test port, and a pair of outlets, one outlet being coupled to said second foreline, and
    a bypass valve coupled between said first foreline and the other outlet of said vacuum reservoir, said bypass valve being open in the high sensitivity operating mode and being closed in the low sensitivity operating mode.

11. Apparatus for leak detection comprising:
    a test port for receiving a test sample containing a trace gas;
    mass spectrometer means tuned to detect said trace gas and having an inlet for receiving said trace gas;
    vacuum pumping means for evacuation of said apparatus in preparation for a leak test;
    a diffusion pump having a pump inlet coupled to the inlet of said mass spectrometer means, a first foreline and a second foreline, said diffusion pump having a first rate of reverse diffusion for said trace gas from said first foreline to said pump inlet and having a second rate of reverse diffusion for said trace gas from said second foreline to said pump inlet, said second reverse diffusion rate being lower than said first reverse diffusion rate;

first means for conducting said test sample from said test port to the first foreline of said diffusion pump;

second means for conducting said test sample from said test port to the second foreline of said diffusion pump; and valve means for blocking conduction of said test sample to the first foreline of said diffusion pump in a low sensitivity operating mode and for passing said test sample to the first foreline of said diffusion pump in a high sensitivity operating mode.

12. Leak detection apparatus as defined in claim 11 further including means for controlling the ratio between said first reverse diffusion rate and said second reverse diffusion rate.

13. Leak detection apparatus as defined in claim 12 wherein said diffusion pump includes at least one annular stage between said first and second forelines and said pump inlet, an ejector stage associated with said second foreline, and a vapor source for supplying vapor to said annular stage and to said ejector stage, and wherein said control means comprises an apertured control plate for controlling the relative rates of vapor flow from said vapor source to said annular stage and to said ejector stage.

14. Leak detection apparatus as defined in claim 12 wherein said ratio between said first reverse diffusion rate and said second reverse diffusion rate is between 10 and 500.

15. Leak detection apparatus as defined in claim 13 wherein said ejector stage includes a nozzle that directs vapor into said second foreline, and further including means for cooling the vapor directed into said second foreline.

16. Leak detection apparatus as defined in claim 15 wherein said cooling means comprises cooling fins on said second foreline and means for directing an air flow over said cooling fins.

17. Leak detection apparatus as defined in claim 11 wherein said valve means comprises a bypass valve in said first conducting means.

18. A diffusion pump for use in a counterflow leak detector utilizing a mass spectrometer means, comprising:

a pump inlet for coupling to an inlet of said mass spectrometer means;

a first foreline for receiving a test sample containing a trace gas in a high sensitivity operating mode;

a second foreline for receiving a test sample containing a trace gas in a low sensitivity operating mode;

pumping means for providing a first reverse diffusion rate for said trace gas from said first foreline to said pump inlet and for providing a second reverse diffusion rate for said trace gas from said second foreline to said pump inlet, said second reverse diffusion rate being lower than said first reverse diffusion rate; and a vapor source for supplying a vapor to said pumping means.

19. A diffusion pump as defined in claim 18 wherein said pumping means comprises an ejector stage associated with said second foreline and at least one annular stage arranged so that light gases pass from said first foreline through said annular stage to said pump inlet and arranged so that light gases pass from said second foreline through said ejector stage and through said annular stage to said pump inlet.

20. A diffusion pump as defined in claim 19 further including means for controlling the ratio between said first reverse diffusion rate and said second reverse diffusion rate.

21. A diffusion pump as defined in claim 20 wherein said control means comprises an apertured control plate for controlling the relative rates of vapor flow from said vapor source to said annular stage and to said ejector stage.

22. A diffusion pump as defined in claim 21 wherein said control plate is positioned between said vapor source and said annular stage.

23. A diffusion pump as defined in claim 20 wherein the ratio between said first reverse diffusion rate and said second reverse diffusion rate is between 10 and 500.

24. A diffusion pump as defined in claim 19 wherein said ejector stage directs a stream of vapor through an ejector nozzle into said second foreline, and further including means for cooling the vapor directed through said ejector nozzle.

25. A diffusion pump as defined in claim 24 wherein said cooling means comprises cooling fins on said second foreline and means for directing an air flow over said cooling fins.

26. A diffusion pump for use in a counterflow leak detector utilizing a mass spectrometer means, comprising:

a pump inlet;

a first foreline;

a second foreline;

pumping means for providing a first reverse diffusion rate for light gases between said first foreline and said pump inlet and for providing a second reverse diffusion rate for light gases between said second foreline and said pump inlet, said second reverse diffusion rate being lower than said first reverse diffusion rate, said pumping means including an ejector stage associated with said second foreline and at least one annular stage arranged so that light gases pass from said first foreline through said annular stage to said pump inlet and arranged so that light gases pass from said second foreline through said ejector stage and through said annular stage to said pump inlet; and a vapor source for supplying a vapor to said pumping means.

* * * * *